United States Patent [19]

Shekhawat et al.

[11] Patent Number: 5,550,456
[45] Date of Patent: Aug. 27, 1996

[54] VOLTAGE/CURRENT CONTROLLED VOLTAGE REGULATOR TO ELIMINATE EXCITER FIELD SATURATION

[75] Inventors: Sampat Shekhawat, Tinton Falls; Eli Liebermann, Ocean; William M. Scherzinger; Gayton L. Silvestro, both of Brick; Nick Suttora, Fairview, all of N.J.; David Hodge, Reading, England

[73] Assignee: AlliedSignal Inc., Morris Township, N.J.

[21] Appl. No.: 281,387

[22] Filed: Jul. 27, 1994

[51] Int. Cl.⁶ ................................................. H02P 9/00
[52] U.S. Cl. ............................................ 322/25; 322/17
[58] Field of Search .............................. 322/17, 29, 59; 290/31

[56] References Cited

U.S. PATENT DOCUMENTS

| | | | |
|---|---|---|---|
| 4,262,242 | 4/1981 | Glennon | 322/28 |
| 4,467,267 | 8/1984 | Hucker et al. | 322/61 |
| 5,254,935 | 10/1993 | Vercesi et al. | 322/29 |
| 5,285,147 | 2/1994 | Rashid | 322/28 |
| 5,325,043 | 6/1994 | Parro | 322/23 |

Primary Examiner—Thomas M. Dougherty
Assistant Examiner—Nicholas Ponomarenko
Attorney, Agent, or Firm—Verne E. Kreger, Jr.

[57] ABSTRACT

A control scheme for a wound rotor synchronous generator whereby feedback signals corresponding to the exciter field current and the generator output voltage potential combine together to control the generator output voltage in such a way that at lower generator speeds and lower load requirements, exciter field current saturation is eliminated by reducing generator output voltage. The generator control scheme includes a circuit for sensing exciter field current in logic cooperation with a circuit for sensing generator voltage. Both sensing circuits regulate the current applied to the exciter field which corresponds to the rectified current applied to the field windings of the power generator. During steady state operations the generator output voltage is regulated using the generator output voltage as a feedback signal. At lower speeds and reduced loads and as the exciter field current approaches the saturation point, the generator output voltage is regulated using the exciter field current as a feedback signal.

8 Claims, 5 Drawing Sheets

5,550,456

VOLTAGE/CURRENT CONTROLLED VOLTAGE REGULATOR TO ELIMINATE EXCITER FIELD SATURATION

BACKGROUND OF THE INVENTION a. Field of the Invention

This invention relates to electrical power generators, and more particularly, to voltage regulation controls for wound rotor synchronous generators for use in aerospace applications, such as aircraft.

b. Description of Related Art

FIG. 1 schematically illustrates a prior art integrated aircraft power generating system 10 for generating three-phase 400 Hz 115 volt alternating current. The integrated power generating system 10 is driven by a power takeoff 12 from an aircraft propulsion engine which varies in speed during operation of the aircraft. The power takeoff 12 is coupled to a constant speed drive transmission 14 which functions to produce a constant speed output on shaft 16 while the rotational speed of the power takeoff varies as is commonly known to those skilled in the art. The integrated power system 10 comprises a permanent magnet generator 18, wound field exciter 20 and a main generator 22 known to those skilled in the art. Each has a rotor mounted on shaft 16 and are all mounted in a housing not illustrated.

Permanent magnet generator 18 has a permanent magnet rotor 24 mounted on the shaft 16. The stator 26 of the generator 18 outputs alternating current which is rectified by rectifier 28 to produce field excitation current which is applied to the stator 30 of the wound field exciter 20. The rotor 32 of exciter 20 outputs alternating current which is rectified by rectifier 34. Rectified current from rectifier 34 is applied to the field windings of the rotor 36 of the main generator 22 to control the output voltage of the main generator. The stator 38 outputs three-phase 400 Hz 115 volt alternating current for use in powering the various electrical loads of the aircraft.

Normally, the voltage regulator for the wound rotor synchronous generator 22 controls generator output voltage by controlling the field current of exciter 20 using the generator output voltage potential as a feedback signal to the regulator. At low engine speeds, which translates into low generator speeds, however, the generator 22 cannot supply the load requirements because the field of exciter 20 reaches current saturation and prevents voltage regulation of the generator 22. Low speed conditions exist in an aircraft, for example, during start-up of the engines, aircraft taxi on the runway and landing. As such, during low engine speeds, the aircraft must rely on alternate power sources, such as an auxiliary power unit, to meet the power requirements of the aircraft.

SUMMARY OF THE INVENTION

The present invention provides a control scheme for a wound rotor synchronous generator whereby feedback signals corresponding to the exciter field current and the generator output voltage potential combine together to control the generator output voltage in such a way that at lower generator speeds and lower load requirements, exciter field current saturation is eliminated by reducing generator output voltage. The generator control scheme comprises a circuit means for sensing exciter field current in logic cooperation with a circuit means for sensing generator output voltage. Both circuit means regulate the current applied to the exciter field which corresponds to the rectified current applied to the field windings of the power generator. During steady state operation, for example, when the aircraft is cruising, the generator output voltage is regulated using the generator output voltage as a feedback signal. At lower speeds and reduced loads and as the exciter field current approaches the saturation point, the generator output voltage is regulated using the exciter field current as a feedback signal. Therefore, the generator output voltage is reduced in order to maintain the exciter field current below current saturation levels.

An alternate embodiment of the invention utilizes generator speed as a feedback to a voltage regulator to limit exciter field current saturation.

It is therefore an object of the invention to provide a control circuit for a wound rotor synchronous generator so that the generator operates effectively at low speeds.

It is an advantage of the invention that the generator can provide the power requirements of the aircraft at low engine speeds without having to rely on alternate power sources.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

The following detailed description, which describes only the preferred embodiments of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

Figure 1:
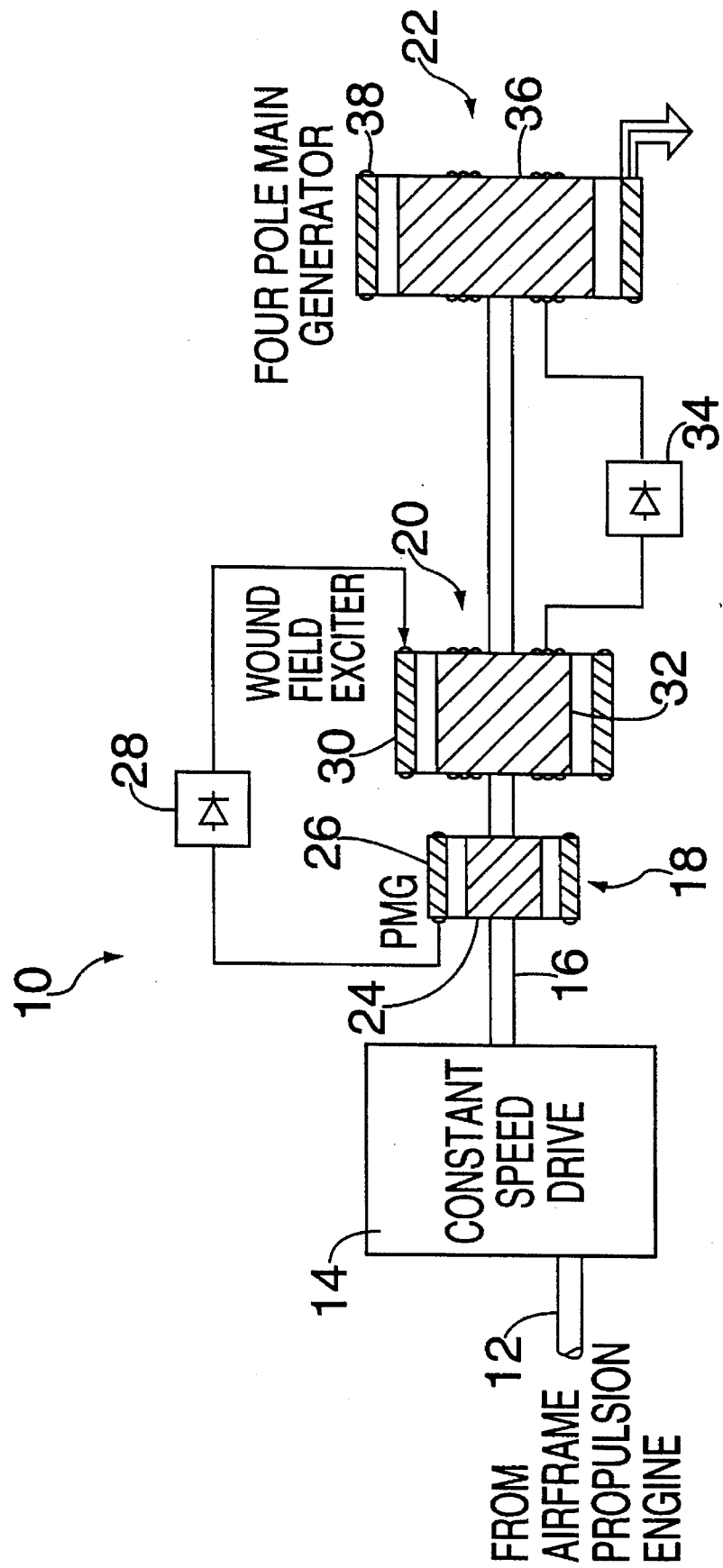
FIG. 1 illustrates a prior art electrical power generating system.
Figure 2:
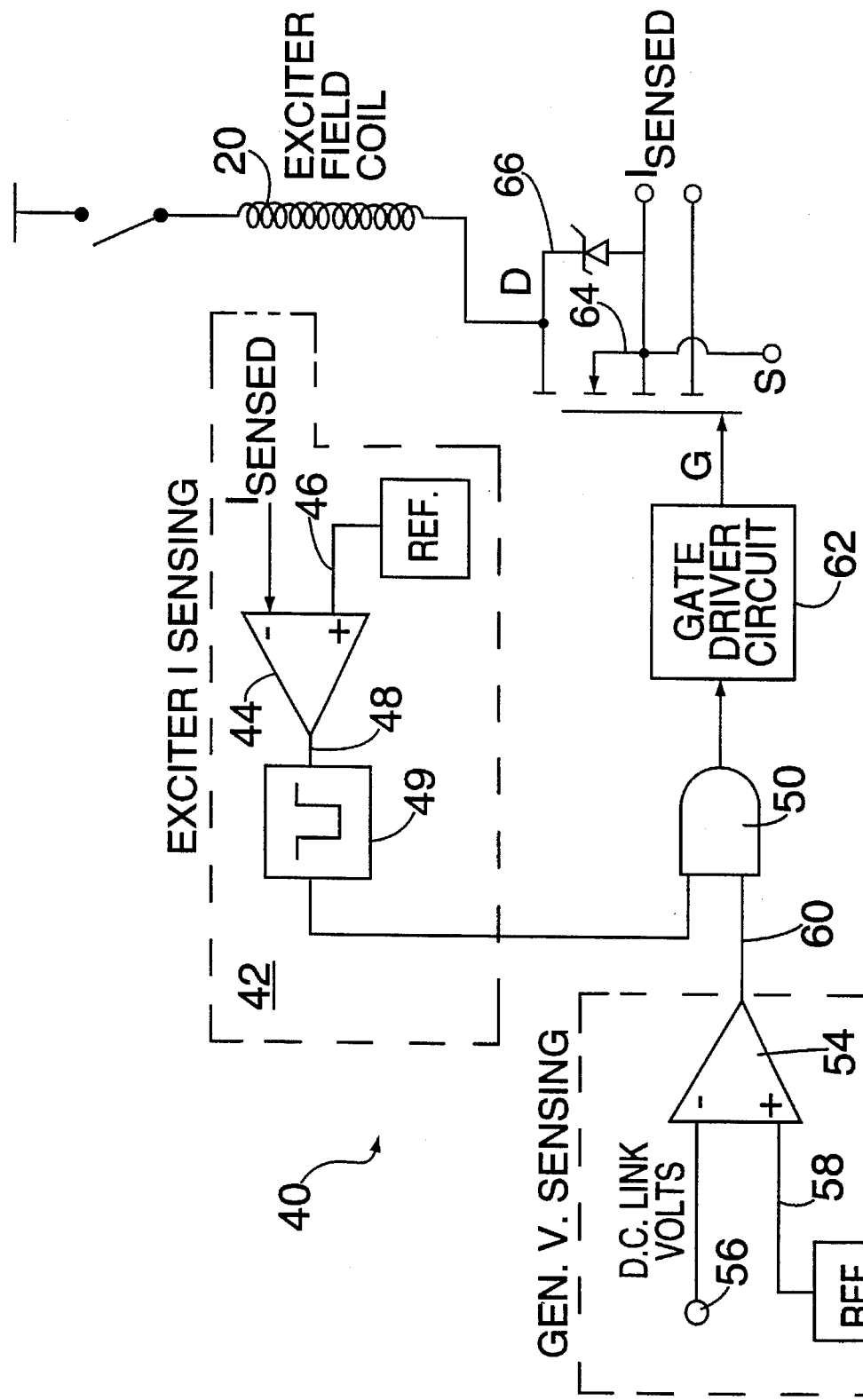
FIG. 2 is an electrical schematic of the voltage regulator which regulates both generator voltage and exciter field current.

FIG. 2 illustrates the general concepts of the present invention, a generator voltage regulator circuit 40 that eliminates exciter field current saturation. The regulator circuit 40 comprises an exciter field current sensing circuit 42 and a generator output voltage sensing circuit 52. Current sensing circuit 42 comprises a comparator 44 that compares the current, $I_{sensed}$, in the exciter field coil 20 with a reference signal 46. As is known to those skilled in the art, reference signal 46 is dependent upon the exciter field saturation design. The output 48 of comparator 44 inputs into a conventional monostable circuit 49. The output of the monostable circuit 49 connects to one input of AND gate 50 and is generally high except when output 48 changes from a high state to a low state. When that occurs the monostable circuit 49 outputs a low pulse.

During steady state operation, the field coil 20 is not in current saturation and output 48 is high, at the level of the reference signal 46. As the speed of the generator 22 decreases, for example during an aircraft landing, $I_{sensed}$ increases accordingly to a level above the reference signal 46. Output 48 goes low so long as this relationship continues and results in a low signal pulse from monostable circuit 49 to AND gate 50.

Figure 4:
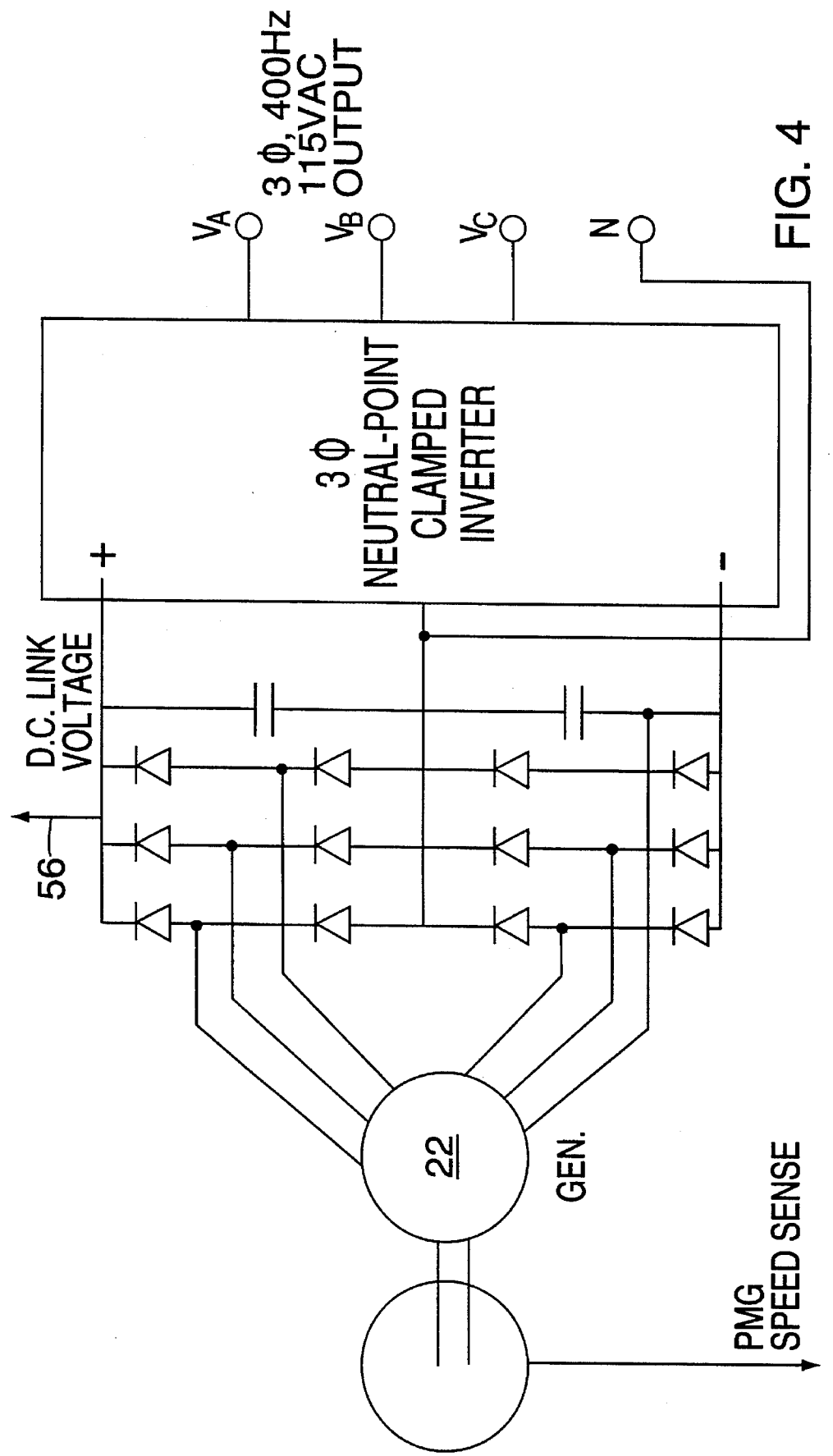
FIG. 4 is an electrical schematic illustrating the DC link voltage.

The other input to AND gate 50 is the output 60 of the voltage sensing circuit 52. Sensing circuit 52 comprises a comparator 54 that compares the DC link volts 56 to a reference voltage signal 58, which is normally valued at the preferred operating voltage of generator 22. DC link volts 56 represent the rectified voltage output of generator 22 as shown in FIG. 4. Output 60 normally pulsates between a high and low signal as the DC link volts varies in relation to reference 58.

A gate driver circuit 62 is controlled by sensing circuits 42 and 52. When both outputs 48 and 60 are high, the gate driver circuit 62 is enabled and drives a power switch 64, which is preferably a power MOSFET with a built-in current sense. It is understood that the gate driver circuit 62, power switch 64 and diode 66 are known to those skilled in the art and are not apart of the subject invention. When either of the outputs from control circuits 42 and 52 is low, the gate driver circuit 62 is disabled and prevents the power switch 64 from firing.

In a steady state operation when the field current $I_{sensed}$ is not at saturation levels, monostable circuit 49 remains high, and the gate driver circuit 62 is controlled by the pulsating output 60. Accordingly, in steady state, the generator output voltage is controlled by voltage sense circuit 52.

As the speed of the generator decreases, the DC link volts 56 eventually decreases to a value below the reference voltage 58 causing output 60 to go high. Without current sensing circuit 42, the field current increases in an attempt to maintain the regulated voltage, and eventually reaches saturation. Current sensing circuit 42 prevents current saturation by sensing the field current $I_{sensed}$. When $I_{sensed}$ increases above reference 46, output 48 goes low causing a low pulse output from the monostable circuit 49. This low input at AND gate 50 disables the gate driver circuit 62 for the time duration of the low pulse output from monostable circuit 49 causing $I_{sensed}$ to decrease and forces the generator voltage to decrease. Accordingly, during low engine speed, the generator output voltage is regulated by $I_{sensed}$ and not the D.C. links volts 56. This field current regulation cycle continues so long as the generator 22 runs at a slow speed and and $I_{sensed}$ approaches saturation. The reduced D.C. link voltage at the input of a three phase neutral-point clamped inverter, shown in FIG. 4, will still maintain a 115 volt a.c. output at lighter loads.

Figure 3:
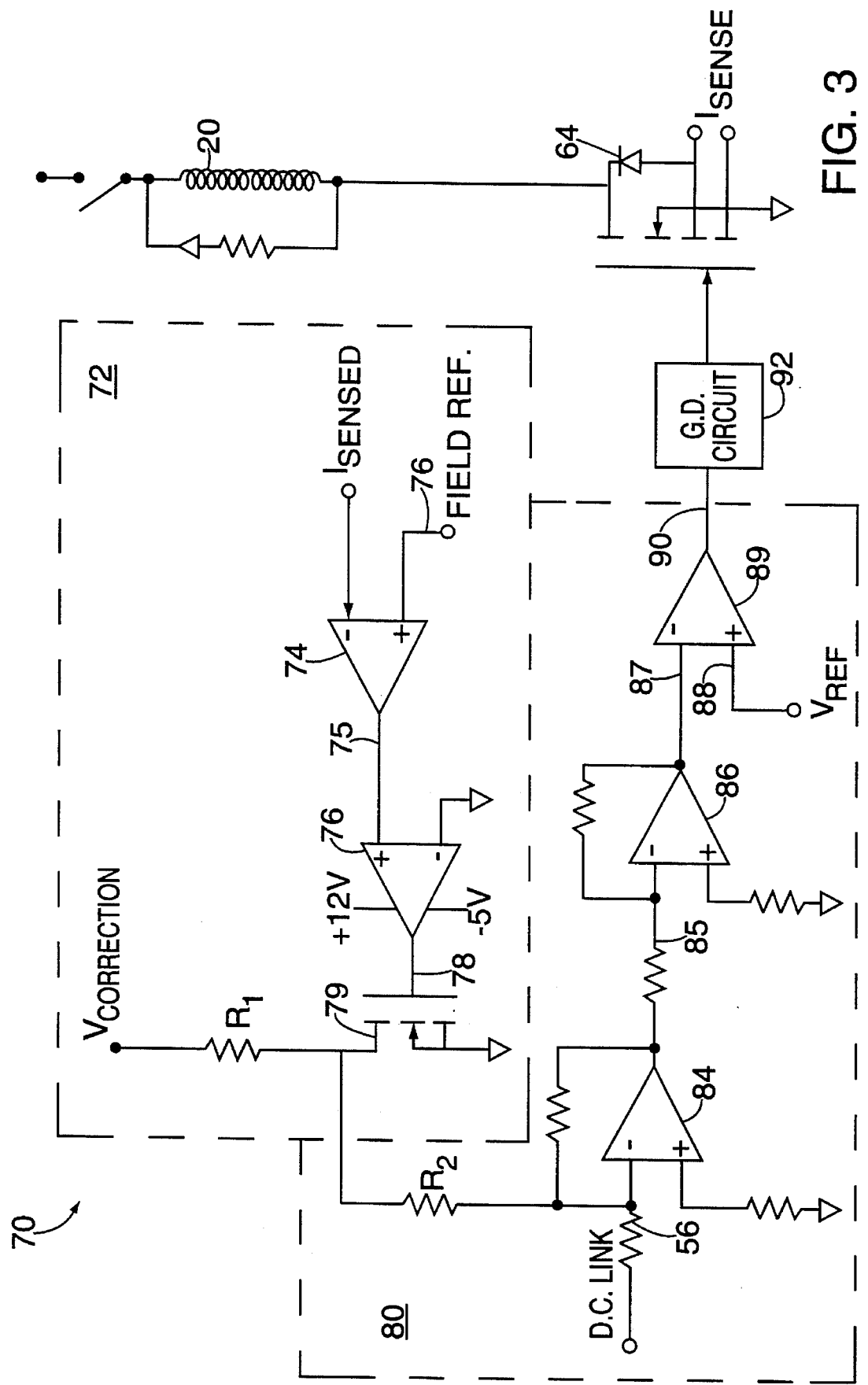
FIG. 3 is an electrical schematic of an alternate embodiment of the voltage regulator of FIG. 2.

FIG. 3 illustrates an alternate embodiment of the present invention. The regulator circuit 70 comprises a current sensing circuit 72 and a voltage sensing circuit 80. The current sensing circuit 72 comprises a controller 74 and comparator 76. Controller 74 compares the exciter field saturation current limit ($I_{sensed}$) flowing through exciter field coil 20 with a reference signal 76. Output 75 is high so long as reference signal 76 is greater than $I_{sensed}$ and goes low when $I_{sensed}$ is greater than reference signal 76. Therefore, the output 78 of comparator 76 is normally high so long as reference signal 76 is higher than $I_{sensed}$. A high level at output 78 energizes a low power switch 79 which effectively shorts $V_{correction}$ to ground via $R_1$.

The voltage sensing circuit 80 comprises a first amplifier 84 that has the DC link voltage 56 summed with a correction voltage via $R_2$ connected to the inverting terminal. Output 85 connects to the inverting terminal of a second amplifier 86 which corrects the polarity of the input. The output 87 relates proportionally to the D.C. link volts 56 and is input into the inverting terminal of a comparator 89. Signal 87 is compared with a voltage reference signal 88.

A gate driver circuit 92 is controlled by output 90. When voltage reference 88 is greater than input 87, output 90 is high and enables the gate driving circuit 92 and drives a power switch 64, which is preferably a power MOSFET with a built-in current sense. When output 90 is low the gate driver circuit 92 is disabled and prevents the power switch 64 from firing.

Accordingly, in a steady state application where the field current $I_{sensed}$ is not at saturation levels, output 75 remains high, and the power switch 79 is energized to short out $R_2$. Therefore, only the DC link volts 56 is amplified at amplifiers 84 and 86 and compared with reference voltage 88 to control the gate driver circuit 92. Output 90 will pulsate as the DC link volts 56 is controlled about voltage reference 88.

As the speed of the generator decreases, for example during an aircraft landing, the DC link volts 56 eventually decreases to a value below the reference voltage 88 causing output 90 to go high resulting in power switch 64 to stay full on. Without current sensing circuit 72, the field current increases in an attempt to maintain the regulated voltage, and eventually reaches saturation. Current sensing circuit 72 prevents current saturation by sensing the field current. When $I_{sensed}$ increases above reference 76, output 75 will go low thereby forcing the output of comparator 76 to go low to a signal of −5 V causing the low power switch to turn off. $R_2$ is no longer shorted by switch 79 and the DC link volts value 56 is increased by $V_{correction}$. This value is amplified through amplifiers 84 and 86 and then compared with voltage reference signal 88. Output 87 is so much greater than signal 88 due to $V_{correction}$ that output 90 will go low, disabling gate driver circuit 92 and de-energizing switch 64. At this point, the generator volts is regulated by $I_{sensed}$ and not the voltage reference signal 88. Accordingly, D.C. link voltage will decrease to satisfy the condition that the field coil current will not saturate. The reduced D.C. link voltage at the input of three phase neutral-point clamped inverter will still maintain 115 volt a.c. output at lighter load.

Figure 5:
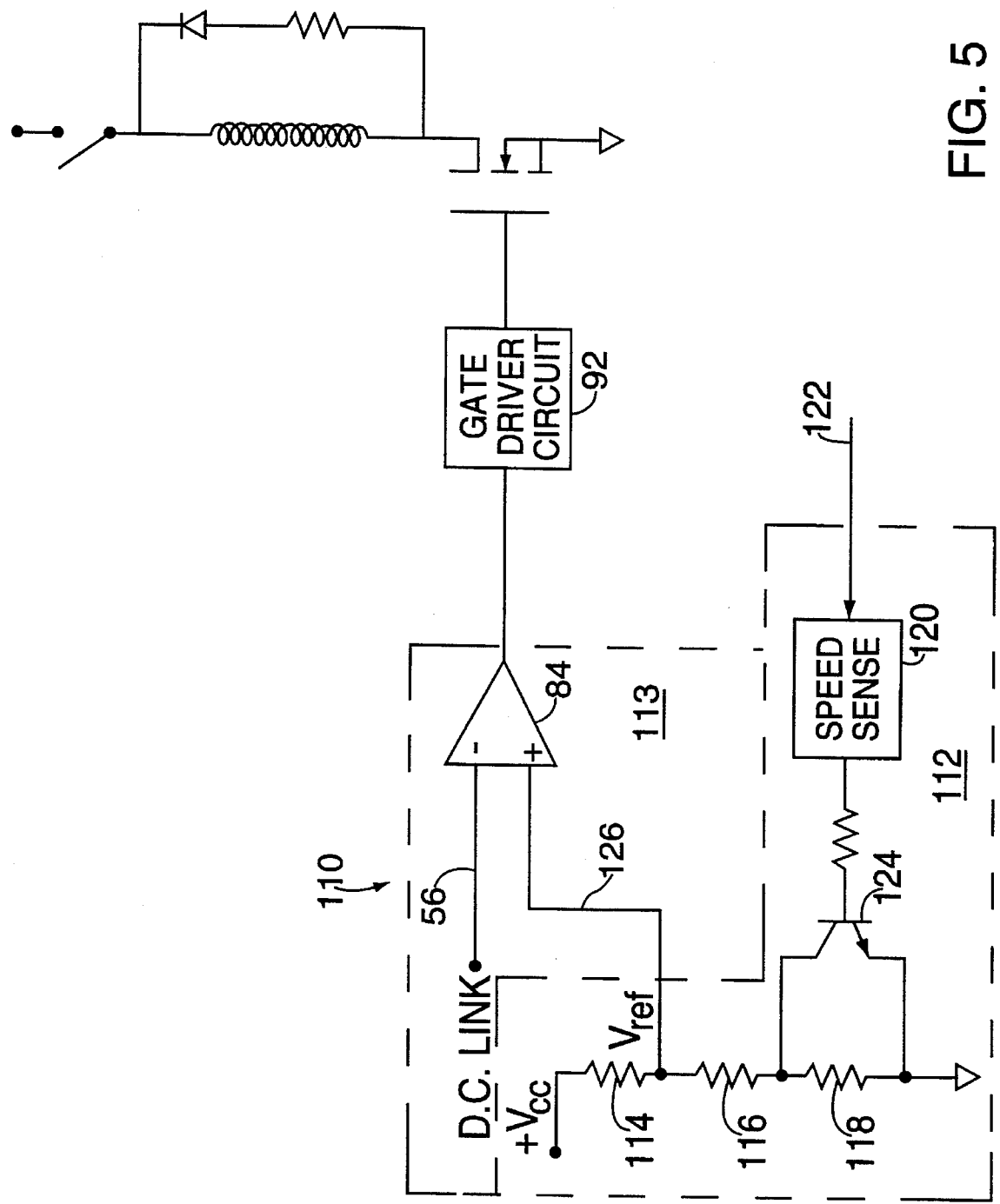
FIG. 5 is an electrical schematic of an alternate embodiment which utilizes the generator speed to regulate output voltage.

FIG. 5 illustrates another alternate embodiment of the present invention. The voltage regulator circuit 110 comprises a speed sensing circuit 112 in logic cooperation with a voltage sensing circuit 113. The speed sensing circuit 112 comprises speed sense logic 120, known to those skilled in the art, a signal transistor or FET 124 and three resistors 114, 116 and 118. The speed sense logic 120 accepts a speed signal 122 from either of the PMG 18, exciter 20 or main generator 22. When the generator speed is below a set point that would cause exciter field current saturation, speed sense logic 120 energizes transistor 124 which shorts out resistor 118. When resistor 118 shorts out, the voltage reference signal $V_{ref}$ reduces in value causing the output of comparator 84 to go low and disabling the gate driver circuit 92. Accordingly, exciter field current will be limited and current saturation will not occur.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An aircraft electrical generating system producing an output potential comprising:
   (a) an excitation generator which is rotatably driven having a rotor from which a variable current is output;
   (b) a wound rotor synchronous generator which is rotatably driven having a rotor that accepts said variable current output and a stator from which current at the output potential is generated in response to said current output; and
   (c) a voltage regulator for controlling said current output comprising an excitation generator field current regulating circuit comprising an output potential sensing circuit in logic cooperation with a field current sensing circuit wherein said output potential sensing circuit regulates said output current at aircraft steady state engine speeds and said field current sensing circuit regulates said output current at low aircraft engine speeds.

2. The aircraft electrical generating system of claim 1 wherein said field current sensing circuit and said output potential sensing circuit regulate said output current at low aircraft engine speeds.

3. A power generating system in accordance with claim 1 wherein said field current sensing circuit prevents the field coil of said excitation generator from reaching current saturation.

4. An aircraft electrical generating system producing an output potential comprising:
   (a) an excitation generator which is rotatably driven having a rotor from which a variable current is output;
   (b) a wound rotor synchronous generator which is rotatably driven having a rotor that accepts said variable current output and a stator from which current at the output potential is generated in response to said current output; and
   (c) a voltage regulator for controlling said current output comprising an excitation generator field current regulating circuit comprising an output potential sensing circuit in logic cooperation with a generator speed sensing circuit wherein said output potential sensing circuit and said speed sensing circuit regulate said output current at low aircraft engine speeds.

5. A power generating system in accordance with claim 4 wherein said generator speed sensing circuit prevents the field coil of said excitation generator from reaching current saturation.

6. A power generating system for producing a regulated output potential comprising:
   (a) a main generator having a stator and a rotor, said rotor is mounted on a shaft which is rotatably driven to cause current at said output potential to be generated by said stator of said main generator;
   (b) an excitation generator having a rotor mounted on said shaft and a stator from which a regulated current signal is output to the field windings of said rotor of said main generator; and
   (c) a voltage regulator coupled to said output potential, to the field coil of said excitation generator and to the excitation current applied to said field coil of said excitation generator for regulating said excitation current to control said current signal output;
   wherein said voltage regulator comprises a first regulation circuit means for controlling the output potential as a function of said excitation current in logic cooperation with a second regulation circuit means for controlling the output potential as a function of said output potential.

7. A power generating system in accordance with claim 6 wherein said first regulation circuit means prevents said field coil from reaching current saturation.

8. A power generating system in accordance with claim 6 wherein said output potential is a three-phase alternating current at 400 Hz.

* * * * *